(12) United States Patent
Son et al.

(10) Patent No.: US 12,107,676 B2
(45) Date of Patent: Oct. 1, 2024

(54) METHOD AND DEVICE FOR TRANSMITTING AND RECEIVING SIDELINK DATA IN COMMUNICATION SYSTEM

(71) Applicants: Hyundai Motor Company, Seoul (KR); Kia Corporation, Seoul (KR)

(72) Inventors: Hyuk Min Son, Jeollabuk-do (KR); Gene Back Hahn, Gyeonggi-do (KR); In Yong Jung, Gyeonggi-do (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 252 days.

(21) Appl. No.: 17/422,874

(22) PCT Filed: Nov. 11, 2020

(86) PCT No.: PCT/KR2020/015723
§ 371 (c)(1),
(2) Date: Jul. 14, 2021

(87) PCT Pub. No.: WO2021/096201
PCT Pub. Date: May 20, 2021

(65) Prior Publication Data
US 2022/0103287 A1    Mar. 31, 2022

Related U.S. Application Data

(60) Provisional application No. 62/935,276, filed on Nov. 14, 2019.

(51) Int. Cl.
*H04L 1/00* (2006.01)
*H04L 1/08* (2006.01)
(Continued)

(52) U.S. Cl.
CPC ......... *H04L 1/0004* (2013.01); *H04L 1/0038* (2013.01); *H04L 1/08* (2013.01);
(Continued)

(58) Field of Classification Search
CPC ....... H04L 1/0004; H04L 1/0038; H04L 1/08; H04L 1/1812; H04L 1/0016;
(Continued)

(56) References Cited

U.S. PATENT DOCUMENTS

2006/0039299 A1* 2/2006 Ihm ................. H04L 1/0625
370/254
2017/0048905 A1 2/2017 Yun et al.
(Continued)

FOREIGN PATENT DOCUMENTS

EP          3 780 674 B1    2/2021
KR          20190027041 A   3/2019
WO          WO-2020033622 A1 * 2/2020 .......... H04L 1/1854

OTHER PUBLICATIONS

R1-1908890; Discussion on Physical Layer Procedures for NR Sidelink; 3GPP TSG RAN WG1 #98; Prague, CZ, Aug. 26-30, 2019.
(Continued)

*Primary Examiner* — Rownak Islam
(74) *Attorney, Agent, or Firm* — Fox Rothschild LLP

(57) ABSTRACT

Disclosed are a method and device for transmitting and receiving sidelink data in a communication system. An operation method of a first terminal comprises the steps of: generating first SCI including MCS change information indicating whether to change an MCS used for sidelink communication; transmitting the first SCI to a second terminal on a PSCCH; performing a coding operation and a modulation operation on first data on the basis of the MCS determined by the MCS change information; and transmitting the first data to the second terminal on a PSSCH.

14 Claims, 7 Drawing Sheets

(51) Int. Cl.
  *H04L 1/1812* (2023.01)
  *H04W 72/1263* (2023.01)
  *H04W 72/20* (2023.01)

(52) U.S. Cl.
  CPC ....... *H04L 1/1812* (2013.01); *H04W 72/1263* (2013.01); *H04W 72/20* (2023.01)

(58) Field of Classification Search
  CPC ............... H04L 1/0003; H04L 1/1896; H04W 72/1263; H04W 72/20; H04W 92/18
  USPC .......................................................... 370/329
  See application file for complete search history.

(56) References Cited

U.S. PATENT DOCUMENTS

| | | | | |
|---|---|---|---|---|
| 2019/0020440 | A1* | 1/2019 | Santhanam | H04L 1/1614 |
| 2020/0100048 | A1* | 3/2020 | Wu | H04W 40/20 |
| 2020/0413431 | A1* | 12/2020 | Park | H04L 1/0009 |
| 2022/0116931 | A1* | 4/2022 | Hwang | H04W 24/10 |
| 2022/0173828 | A1* | 6/2022 | Yoshioka | H04L 1/0003 |
| 2022/0173829 | A1* | 6/2022 | Huang | H04W 72/02 |
| 2022/0303985 | A1* | 9/2022 | Miao | H04W 72/0446 |

OTHER PUBLICATIONS

R1-1912203; Sidelink physical structure for NR V2X communication; 3GPP TSG RAN WG1 Meeting #99; Reno, Nevada, USA, Nov. 18-22, 2019.

R1-1912586; Discussion on physical layer structure for NR sidelink; 3GPP TSG RAN WG1 #99; Reno, USA, Nov. 18-22, 2019.

R1-1911725; Summary of RAN1 Agreements/Working assumptions in Wi 5G V2X with NR sidelink; 3GPP TSG RAN WG1 #98bis; Chongqing, China, Oct. 14-20, 2019.

"Physical Layer Structure for NR V2X Sidelink", 3GPP TSG RAN WG1 #99 , R1-1912738, Reno, USA, Nov. 18-22, 2019, 17 pages.

"Discussion on physical layer structure for NR sidelink", 3GPP TSG RAN WG1 #99, R1-1912586, Reno, USA, Nov. 18-22, 2019, 34 pages.

* cited by examiner

METHOD AND DEVICE FOR TRANSMITTING AND RECEIVING SIDELINK DATA IN COMMUNICATION SYSTEM

CROSS-REFERENCE TO RELATED APPLICATIONS

This application is a National Phase application filed under 35 USC 371 of PCT International Application No. PCT/KR2020/015723 with an International Filing Date of Nov. 11, 2020, which claims the benefit of U.S. Provisional Application 62/935,276 filed on Nov. 14, 2019. The entire contents of these applications are incorporated herein by reference in their entirety.

BACKGROUND

(a) Technical Field

The present disclosure relates to a sidelink communication technique, more particularly, to a technique of retransmitting sidelink data in a communication system.

(b) Description of the Related Art

A fifth-generation (5G) communication system (e.g., New Radio (NR) communication system) which uses a frequency band higher than a frequency band of a fourth-generation (4G) communication system (e.g., Long Term Evolution (LTE) communication system or LTE-Advanced (LTE-A) communication system) as well as the frequency band of the 4G communication system has been considered for processing of wireless data. The 5G communication system can support Enhanced Mobile Broadband (eMBB) communications, Ultra-Reliable and Low-Latency communications (URLLC), massive Machine Type Communications (mMTC), and the like.

The 4G communication system and the 5G communication system can support Vehicle-to-Everything (V2X) communications. The V2X communications supported in a cellular communication system, such as the 4G communication system, the 5G communication system, and the like, may be referred to as "Cellular-V2X (C-V2X) communications." The V2X communications (e.g., C-V2X communications) may include Vehicle-to-Vehicle (V2V) communications, Vehicle-to-Infrastructure (V2I) communications, Vehicle-to-Pedestrian (V2P) communication, Vehicle-to-Network (V2N) communication, and the like.

In the cellular communication systems, the V2X communications (e.g., C-V2X communications) may be performed based on sidelink communication technologies (e.g., Proximity-based Services (ProSe) communication technology, Device-to-Device (D2D) communication technology, or the like). For example, sidelink channels for vehicles participating in V2V communications can be established, and communications between the vehicles can be performed using the sidelink channels. Sidelink communication may be performed using configured grant (CG) resources. The CG resources may be periodically configured, and periodic data (e.g., periodic sidelink data) may be transmitted using the CG resources.

Meanwhile, it may be necessary to retransmit data in sidelink communication. That is, there is a need for a method of designing sidelink control information (SCI) for retransmission of sidelink data and/or a feedback method of a hybrid automatic repeat request (HARQ) response to the sidelink data.

SUMMARY

An objective of the present disclosure is to provide a method and an apparatus for retransmission of sidelink data in a communication system.

An operation method of a first terminal, according to a first exemplary embodiment of the present disclosure, may comprise: generating first sidelink control information (SCI) including modulation and coding scheme (MCS) change information indicating whether an MCS used for sidelink communication is changed; transmitting the first SCI to a second terminal on a physical sidelink control information (PSCCH); performing a coding operation and a modulation operation on the first data based on an MCS determined by the MCS change information; and transmitting the first data to the second terminal on a physical sidelink shared channel (PSSCH).

The operation method may further comprise transmitting one or more data to the second terminal without receiving a hybrid automatic repeat request (HARQ) response for the first data, wherein the transmissions of the one or more data may be scheduled by the first SCI, and the first data and the one or more data may be the same data.

The operation method may further comprise: transmitting second SCI for scheduling transmission of second data to the second terminal; transmitting the second data to the second terminal based on the second SCI; and receiving a HARQ response for the first data and a HARQ response for the second data from the second terminal.

The first SCI may further include an information element indicating a total number of retransmissions of same data and an information element indicating a total number of blind retransmissions of the same data, and the total number of blind retransmissions may indicate a total number of transmissions of the same data without reception of a HARQ response.

The first SCI may further include an information element indicating a remaining number of retransmissions of same data and an information element indicating a remaining number of blind retransmissions of the same data, and the remaining number of blind retransmissions may indicate a remaining number of transmissions of the same data without reception of a HARQ response.

The first SCI may further include an information element indicating a remaining number of retransmissions of same data and an information element indicating whether blind retransmission is performed.

The MCS may be an MCS index or MCS table.

The first SCI may further include an MCS index.

An operation method of a second terminal, according to a second exemplary embodiment of the present disclosure for achieving the objective, may comprise: receiving, from a first terminal, first sidelink control information (SCI) on a physical sidelink control information (PSCCH), the first SCI including resource allocation information of first data and modulation and coding scheme (MCS) change information indicating whether an MCS used for sidelink communication is changed; performing a monitoring operation on a physical sidelink shared channel (PSSCH) indicated by the resource allocation information; and performing a decoding operation on the first data obtained by the monitoring operation, wherein the decoding operation is performed based on an MCS determined by the MCS change information.

The operation method may further comprise receiving one or more data from the first terminal without transmitting a hybrid automatic repeat request (HARQ) response for the first data, wherein the transmissions of the one or more data may be scheduled by the first SCI, and the first data and the one or more data may be the same data.

The operation method may further comprise: receiving second SCI for scheduling transmission of second data from the first terminal; receiving the second data from the first terminal based on the second SCI; and transmitting a HARQ response for the first data and a HARQ response for the second data to the first terminal.

The first SCI may further include an information element indicating a total number of retransmissions of same data and an information element indicating a total number of blind retransmissions of the same data, and the total number of blind retransmissions may indicate a total number of transmissions of the same data without reception of a HARQ response.

The first SCI may further include an information element indicating a remaining number of retransmissions of same data and an information element indicating a remaining number of blind retransmissions of the same data, and the remaining number of blind retransmissions may indicate a remaining number of transmissions of the same data without reception of a HARQ response.

The first SCI may further include an information element indicating a remaining number of retransmissions of same data and an information element indicating whether blind retransmission is performed.

The MCS may be an MCS table, and the first SCI may further include an MCS index.

A first terminal, according to a third exemplary embodiment of the present disclosure for achieving the objective, may comprise: a processor and a memory storing one or more instructions executable by the processor, wherein the one or more instructions cause the first terminal to: generate first sidelink control information (SCI) including modulation and coding scheme (MCS) change information indicating whether an MCS used for sidelink communication is changed; transmit the first SCI to a second terminal on a physical sidelink control information (PSCCH); perform a coding operation and a modulation operation on the first data based on an MCS determined by the MCS change information; and transmit the first data to the second terminal on a physical sidelink shared channel (PSSCH).

The one or more instructions may further cause the first terminal to transmit one or more data to the second terminal without receiving a hybrid automatic repeat request (HARQ) response for the first data, wherein the transmissions of the one or more data may be scheduled by the first SCI, and the first data and the one or more data may be the same data.

The one or more instructions may further cause the first terminal to: transmit second SCI for scheduling transmission of second data to the second terminal; transmit the second data to the second terminal based on the second SCI; and receive a HARQ response for the first data and a HARQ response for the second data from the second terminal.

The first SCI may include at least one of an information element indicating a total number of retransmissions of same data, an information element indicating a total number of blind retransmissions of the same data, an information element indicating a remaining number of retransmissions of the same data, an information element indicating a remaining number of blind retransmissions of the same data, and an information element indicating whether blind retransmission is performed, the total number of blind retransmissions may indicate a total number of transmissions of the same data without reception of a HARQ response, and the remaining number of blind retransmissions may indicate a remaining number of transmissions of the same data without reception of a HARQ response.

The MCS may be an MCS table, and the first SCI may further include an MCS index.

According to the exemplary embodiments of the present disclosure, sidelink control information (SCI) including retransmission-related information may be transmitted, and a (re)transmission procedure of data may be performed based on the retransmission-related information included in the SCI. In addition, the SCI may include modulation and coding scheme (MCS) change information, and the (re)transmission procedure of the data may be performed based on an MCS determined based on the MCS change information. Accordingly, the (re)transmission procedure of the data in sidelink communication can be efficiently performed, and the performance of the communication system can be improved.

DETAILED DESCRIPTION

Figure 1:
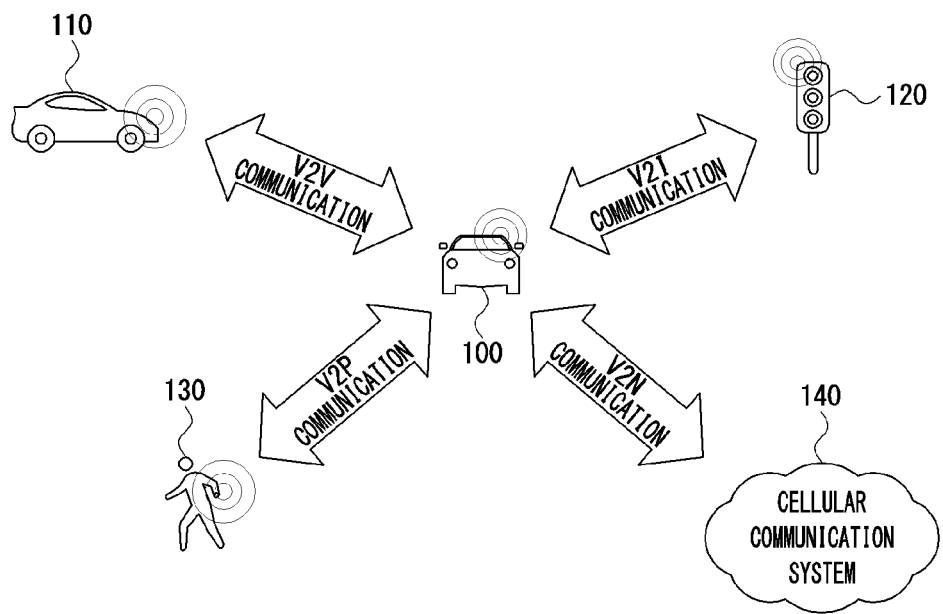
FIG. 1 is a conceptual diagram illustrating V2X communication scenarios.

While the present invention is susceptible to various modifications and alternative forms, specific embodiments are shown by way of example in the drawings and described in detail. It should be understood, however, that the description is not intended to limit the present invention to the specific embodiments, but, on the contrary, the present invention is to cover all modifications, equivalents, and alternatives that fall within the spirit and scope of the present invention.

Although the terms "first," "second," etc. may be used herein in reference to various elements, such elements should not be construed as limited by these terms. These terms are only used to distinguish one element from another. For example, a first element could be termed a second element, and a second element could be termed a first element, without departing from the scope of the present invention. The term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directed coupled" to another element, there are no intervening elements.

The terminology used herein is for the purpose of describing particular embodiments only and is not intended to be limiting of embodiments of the present invention. As used herein, the singular forms "a," "an," and "the" are intended to include the plural forms as well, unless the context clearly indicates otherwise. It will be further understood that the terms "comprises," "comprising," "includes," and/or "including," when used herein, specify the presence of stated features, integers, steps, operations, elements, parts, and/or combinations thereof, but do not preclude the presence or addition of one or more other features, integers, steps, operations, elements, parts, and/or combinations thereof.

Unless otherwise defined, all terms (including technical and scientific terms) used herein have the same meaning as commonly understood by those of ordinary skill in the art to which the present invention pertains. It will be further understood that terms defined in commonly used dictionaries should be interpreted as having a meaning that is consistent with their meaning in the context of the related art and will not be interpreted in an idealized or overly formal sense unless expressly so defined herein.

Hereinafter, preferred exemplary embodiments of the present invention will be described in detail with reference to the accompanying drawings. In describing the present invention, to facilitate the entire understanding, like numbers refer to like elements throughout the description of the figures and the repetitive description thereof will be omitted.

FIG. 1 is a conceptual diagram illustrating V2X communication scenarios.

As shown in FIG. 1, the V2X communications may include Vehicle-to-Vehicle (V2V) communications, Vehicle-to-Infrastructure (V2I) communications, Vehicle-to-Pedestrian (V2P) communications, Vehicle-to-Network (V2N) communications, and the like. The V2X communications may be supported by a cellular communication system (e.g., a cellular communication system 140), and the V2X communications supported by the cellular communication system 140 may be referred to as "Cellular-V2X (C-V2X) communications." Here, the cellular communication system 140 may include the 4G communication system (e.g., LTE communication system or LTE-A communication system), the 5G communication system (e.g., NR communication system), and the like.

The V2V communications may include communications between a first vehicle 100 (e.g., a communication node located in the vehicle 100) and a second vehicle 110 (e.g., a communication node located in the vehicle 110). Various driving information such as velocity, heading, time, position, and the like may be exchanged between the vehicles 100 and 110 through the V2V communications. For example, autonomous driving (e.g., platooning) may be supported based on the driving information exchanged through the V2V communications. The V2V communications supported in the cellular communication system 140 may be performed based on "sidelink" communication technologies (e.g., ProSe and D2D communication technologies, and the like). In this case, the communications between the vehicles 100 and 110 may be performed using at least one sidelink channel established between the vehicles 100 and 110.

The V2I communications may include communications between the first vehicle 100 (e.g., the communication node located in the vehicle 100) and an infrastructure (e.g., road side unit (RSU)) 120 located on a roadside. The infrastructure 120 may also include a traffic light or a street light which is located on the roadside. For example, when the V2I communications are performed, the communications may be performed between the communication node located in the first vehicle 100 and a communication node located in a traffic light. Traffic information, driving information, and the like may be exchanged between the first vehicle 100 and the infrastructure 120 through the V2I communications. The V2I communications supported in the cellular communication system 140 may also be performed based on sidelink communication technologies (e.g., ProSe and D2D communication technologies, and the like). In this case, the communications between the vehicle 100 and the infrastructure 120 may be performed using at least one sidelink channel established between the vehicle 100 and the infrastructure 120.

The V2P communications may include communications between the first vehicle 100 (e.g., the communication node located in the vehicle 100) and a person 130 (e.g., a communication node carried by the person 130). The driving information of the first vehicle 100 and movement information of the person 130 such as velocity, heading, time, position, and the like may be exchanged between the vehicle 100 and the person 130 through the V2P communications. The communication node located in the vehicle 100 or the communication node carried by the person 130 may generate an alarm indicating a danger by judging a dangerous situation based on the obtained driving information and movement information. The V2P communications supported in the cellular communication system 140 may be performed based on sidelink communication technologies (e.g., ProSe and D2D communication technologies, and the like). In this case, the communications between the communication node located in the vehicle 100 and the communication node carried by the person 130 may be performed using at least one sidelink channel established between the communication nodes.

The V2N communications may be communications between the first vehicle 100 (e.g., the communication node located in the vehicle 100) and a server connected through the cellular communication system 140. The V2N communications may be performed based on the 4G communication technology (e.g., LTE or LTE-A) or the 5G communication technology (e.g., NR). Also, the V2N communications may be performed based on a Wireless Access in Vehicular Environments (WAVE) communication technology or a Wireless Local Area Network (WLAN) communication technology which is defined in Institute of Electrical and Electronics Engineers (IEEE) 802.11, or a Wireless Personal Area Network (WPAN) communication technology defined in IEEE 802.15.

Meanwhile, the cellular communication system 140 supporting the V2X communications may be configured as follows.

Figure 2:
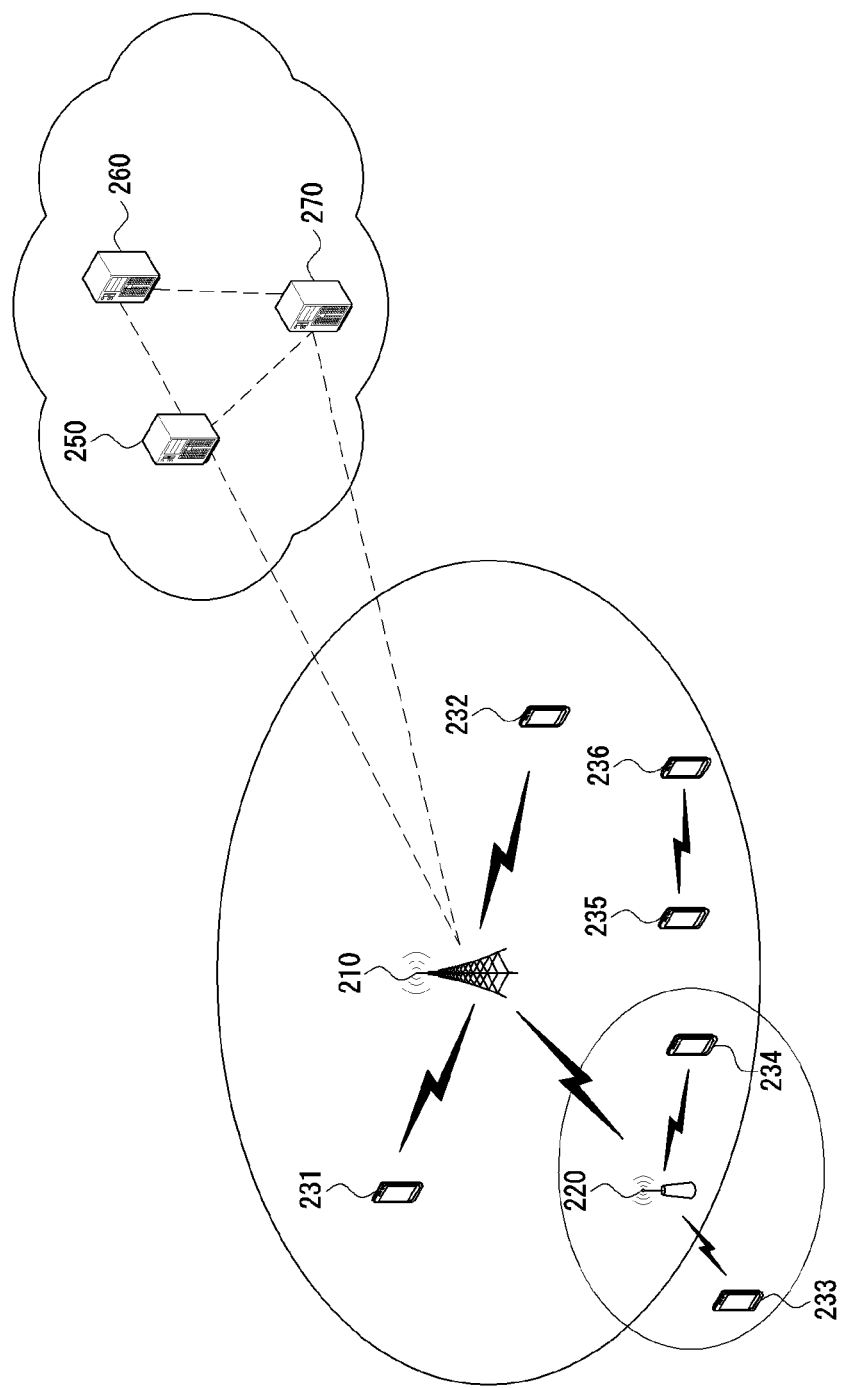
FIG. 2 is a conceptual diagram illustrating an exemplary embodiment of a cellular communication system.

FIG. 2 is a conceptual diagram illustrating an exemplary embodiment of a cellular communication system.

As shown in FIG. 2, a cellular communication system may include an access network, a core network, and the like. The access network may include a base station 210, a relay 220, User Equipments (UEs) 231 through 236, and the like. The UEs 231 through 236 may include communication nodes located in the vehicles 100 and 110 of FIG. 1, the communication node located in the infrastructure 120 of FIG. 1, the communication node carried by the person 130 of FIG. 1, and the like. When the cellular communication system supports the 4G communication technology, the core network may include a serving gateway (S-GW) 250, a packet data network (PDN) gateway (P-GW) 260, a mobility management entity (MME) 270, and the like.

When the cellular communication system supports the 5G communication technology, the core network may include a user plane function (UPF) 250, a session management function (SMF) 260, an access and mobility management function (AMF) 270, and the like. Alternatively, when the cellular communication system operates in a Non-Stand Alone (NSA) mode, the core network constituted by the S-GW 250, the P-GW 260, and the MME 270 may support the 5G communication technology as well as the 4G communication technology, and the core network constituted by the UPF 250, the SMF 260, and the AMF 270 may support the 4G communication technology as well as the 5G communication technology.

In addition, when the cellular communication system supports a network slicing technique, the core network may be divided into a plurality of logical network slices. For example, a network slice supporting V2X communications (e.g., a V2V network slice, a V2I network slice, a V2P network slice, a V2N network slice, etc.) may be configured, and the V2X communications may be supported through the V2X network slice configured in the core network.

The communication nodes (e.g., base station, relay, UE, S-GW, P-GW, MME, UPF, SMF, AMF, etc.) comprising the cellular communication system may perform communications by using at least one communication technology among a code division multiple access (CDMA) technology, a time division multiple access (TDMA) technology, a frequency division multiple access (FDMA) technology, an orthogonal frequency division multiplexing (OFDM) technology, a filtered OFDM technology, an orthogonal frequency division multiple access (OFDMA) technology, a single carrier FDMA (SC-FDMA) technology, a non-orthogonal multiple access (NOMA) technology, a generalized frequency division multiplexing (GFDM) technology, a filter bank multi-carrier (FBMC) technology, a universal filtered multi-carrier (UFMC) technology, and a space division multiple access (SDMA) technology.

The communication nodes (e.g., base station, relay, UE, S-GW, P-GW, MME, UPF, SMF, AMF, etc.) comprising the cellular communication system may be configured as follows.

Figure 3:
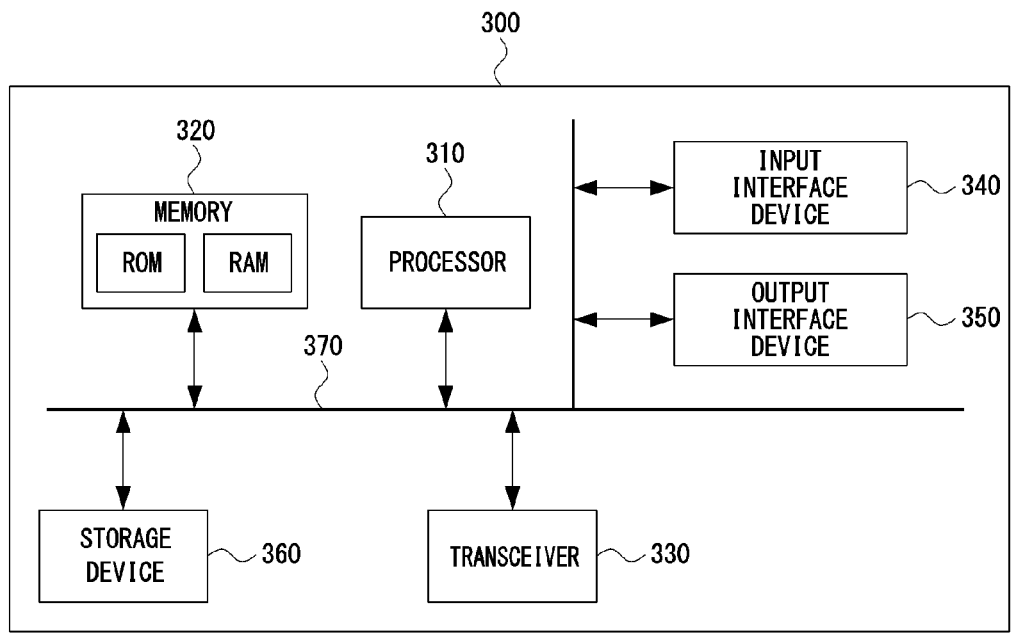
FIG. 3 is a conceptual diagram illustrating an exemplary embodiment of a communication node constituting a cellular communication system.

FIG. 3 is a conceptual diagram illustrating an exemplary embodiment of a communication node constituting a cellular communication system.

As shown in FIG. 3, a communication node 300 may comprise at least one processor 310, a memory 320, and a transceiver 330 connected to a network for performing communications. Also, the communication node 300 may further comprise an input interface device 340, an output interface device 350, a storage device 360, and the like. Each component included in the communication node 300 may communicate with each other as connected through a bus 370.

However, each of the components included in the communication node 300 may be connected to the processor 310 via a separate interface or a separate bus rather than the common bus 370. For example, the processor 310 may be connected to at least one of the memory 320, the transceiver 330, the input interface device 340, the output interface device 350, and the storage device 360 via a dedicated interface.

The processor 310 may execute at least one instruction stored in at least one of the memory 320 and the storage device 360. The processor 310 may refer to a central processing unit (CPU), a graphics processing unit (GPU), or a dedicated processor on which methods in accordance with embodiments of the present disclosure are performed. Each of the memory 320 and the storage device 360 may include at least one of a volatile storage medium and a non-volatile storage medium. For example, the memory 320 may comprise at least one of read-only memory (ROM) and random access memory (RAM).

Referring again to FIG. 2, in the communication system, the base station 210 may form a macro cell or a small cell, and may be connected to the core network via an ideal backhaul or a non-ideal backhaul. The base station 210 may transmit signals received from the core network to the UEs 231 through 236 and the relay 220, and may transmit signals received from the UEs 231 through 236 and the relay 220 to the core network. The UEs 231, 232, 234, 235 and 236 may belong to cell coverage of the base station 210. The UEs 231, 232, 234, 235 and 236 may be connected to the base station 210 by performing a connection establishment procedure with the base station 210. The UEs 231, 232, 234, 235 and 236 may communicate with the base station 210 after being connected to the base station 210.

The relay 220 may be connected to the base station 210 and may relay communications between the base station 210 and the UEs 233 and 234. That is, the relay 220 may transmit signals received from the base station 210 to the UEs 233 and 234, and may transmit signals received from the UEs 233 and 234 to the base station 210. The UE 234 may belong to both of the cell coverage of the base station 210 and the cell coverage of the relay 220, and the UE 233 may belong to the cell coverage of the relay 220. That is, the UE 233 may be located outside the cell coverage of the base station 210. The UEs 233 and 234 may be connected to the relay 220 by performing a connection establishment procedure with the relay 220. The UEs 233 and 234 may communicate with the relay 220 after being connected to the relay 220.

The base station 210 and the relay 220 may support multiple-input, multiple-output (MIMO) technologies (e.g., single user (SU)-MIMO, multi-user (MU)-MIMO, massive MIMO, etc.), coordinated multipoint (CoMP) communication technologies, carrier aggregation (CA) communication technologies, unlicensed band communication technologies (e.g., Licensed Assisted Access (LAA), enhanced LAA (eLAA), etc.), sidelink communication technologies (e.g., ProSe communication technology, D2D communication technology), or the like. The UEs 231, 232, 235 and 236 may perform operations corresponding to the base station 210 and operations supported by the base station 210. The UEs 233 and 234 may perform operations corresponding to the relays 220 and operations supported by the relays 220.

Here, the base station 210 may be referred to as a Node B (NB), an evolved Node B (eNB), a base transceiver station (BTS), a radio remote head (RRH), a transmission reception point (TRP), a radio unit (RU), a roadside unit (RSU), a radio transceiver, an access point, an access node, or the like. The relay 220 may be referred to as a small base station, a relay node, or the like. Each of the UEs 231 through 236 may be referred to as a terminal, an access terminal, a mobile terminal, a station, a subscriber station, a mobile station, a portable subscriber station, a node, a device, an on-broad unit (OBU), or the like.

Meanwhile, the communications between the UEs 235 and 236 may be performed based on the sidelink communication technique. The sidelink communications may be performed based on a one-to-one scheme or a one-to-many scheme. When V2V communications are performed using the sidelink communication technique, the UE 235 may be the communication node located in the first vehicle 100 of FIG. 1 and the UE 236 may be the communication node located in the second vehicle 110 of FIG. 1. When V2I communications are performed using the sidelink communication technique, the UE 235 may be the communication node located in first vehicle 100 of FIG. 1 and the UE 236 may be the communication node located in the infrastructure 120 of FIG. 1. When V2P communications are performed using the sidelink communication technique, the UE 235 may be the communication node located in first vehicle 100 of FIG. 1 and the UE 236 may be the communication node carried by the person 130 of FIG. 1.

The scenarios to which the sidelink communications are applied may be classified as shown below in Table 1 according to the positions of the UEs (e.g., the UEs 235 and 236) participating in the sidelink communications. For example, the scenario for the sidelink communications between the UEs 235 and 236 shown in FIG. 2 may be a sidelink communication scenario C.

TABLE 1

| Sidelink Communication Scenario | Position of UE 235 | Position of UE 236 |
|---|---|---|
| A | Out of coverage of base station 210 | Out of coverage of base station 210 |
| B | In coverage of base station 210 | Out of coverage of base station 210 |
| C | In coverage of base station 210 | In coverage of base station 210 |
| D | In coverage of base station 210 | In coverage of other base station |

Meanwhile, a user plane protocol stack of the UEs (e.g., the UEs 235 and 236) performing sidelink communications may be configured as follows.

Figure 4:
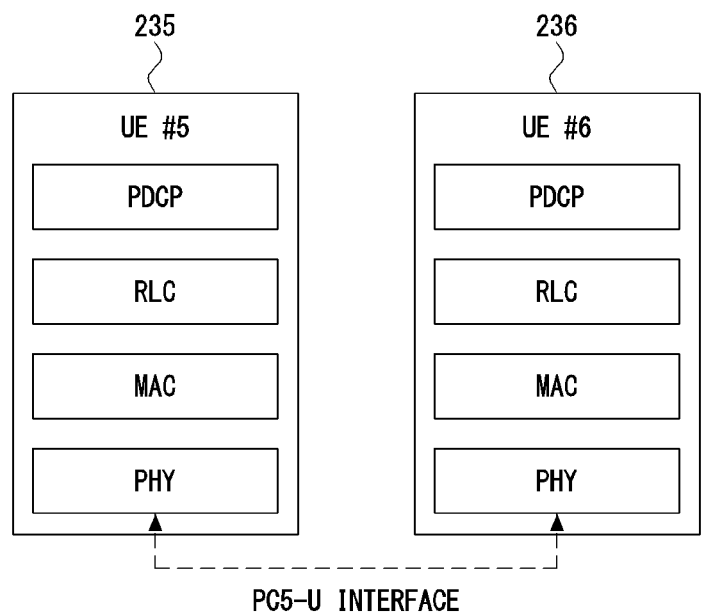
FIG. 4 is a block diagram illustrating an exemplary embodiment of a user plane protocol stack of a UE performing sidelink communication.

FIG. 4 is a block diagram illustrating an exemplary embodiment of a user plane protocol stack of a UE performing sidelink communication.

As shown in FIG. 4, a left UE may be the UE 235 shown in FIG. 2 and a right UE may be the UE 236 shown in FIG. 2. The scenario for the sidelink communications between the UEs 235 and 236 may be one of the sidelink communication scenarios A through D of Table 1. The user plane protocol stack of each of the UEs 235 and 236 may comprise a physical (PHY) layer, a medium access control (MAC) layer, a radio link control (RLC) layer, and a packet data convergence protocol (PDCP) layer.

The sidelink communications between the UEs 235 and 236 may be performed using a PC5 interface (e.g., PC5-U interface). A layer-2 identifier (ID) (e.g., a source layer-2 ID, a destination layer-2 ID) may be used for the sidelink communications, and the layer 2-ID may be an ID configured for the V2X communications (e.g., V2X service). Also, in the sidelink communications, a hybrid automatic repeat request (HARQ) feedback operation may be supported, and an RLC acknowledged mode (RLC AM) or an RLC unacknowledged mode (RLC UM) may be supported.

Meanwhile, a control plane protocol stack of the UEs (e.g., the UEs 235 and 236) performing sidelink communications may be configured as follows.

Figure 5:
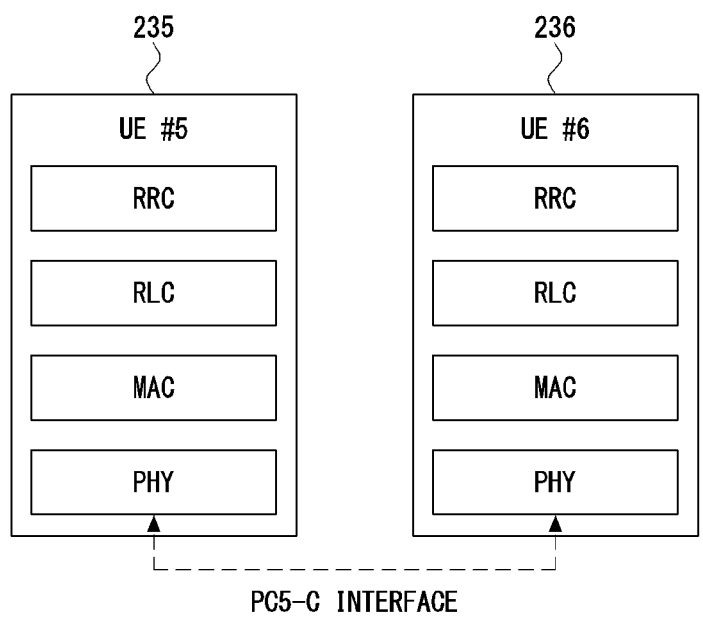
FIG. 5 is a block diagram illustrating a first exemplary embodiment of a control plane protocol stack of a UE performing sidelink communication.
Figure 6:
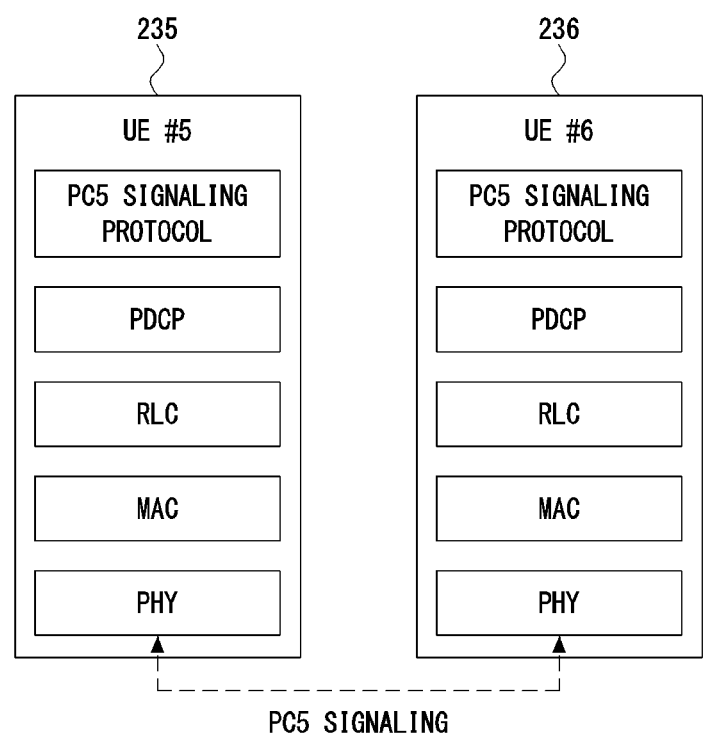
FIG. 6 is a block diagram illustrating a second exemplary embodiment of a control plane protocol stack of a UE performing sidelink communication.

FIG. 5 is a block diagram illustrating a first exemplary embodiment of a control plane protocol stack of a UE performing sidelink communication, and FIG. 6 is a block diagram illustrating a second exemplary embodiment of a control plane protocol stack of a UE performing sidelink communication.

As shown in FIGS. 5 and 6, a left UE may be the UE 235 shown in FIG. 2 and a right UE may be the UE 236 shown in FIG. 2. The scenario for the sidelink communications between the UEs 235 and 236 may be one of the sidelink communication scenarios A through D of Table 1. The control plane protocol stack illustrated in FIG. 5 may be a control plane protocol stack for transmission and reception of broadcast information (e.g., Physical Sidelink Broadcast Channel (PSBCH)).

The control plane protocol stack shown in FIG. 5 may include a PHY layer, a MAC layer, an RLC layer, and a radio resource control (RRC) layer. The sidelink communications between the UEs 235 and 236 may be performed using a PC5 interface (e.g., PC5-C interface). The control plane protocol stack shown in FIG. 6 may be a control plane protocol stack for one-to-one sidelink communication. The control plane protocol stack shown in FIG. 6 may include a PHY layer, a MAC layer, an RLC layer, a PDCP layer, and a PC5 signaling protocol layer.

Meanwhile, channels used in the sidelink communications between the UEs 235 and 236 may include a Physical Sidelink Shared Channel (PSSCH), a Physical Sidelink Control Channel (PSCCH), a Physical Sidelink Discovery Channel (PSDCH), and a Physical Sidelink Broadcast Channel (PSBCH). The PSSCH may be used for transmitting and receiving sidelink data and may be configured in the UE (e.g., UE 235 or 236) by a higher layer signaling. The PSCCH may be used for transmitting and receiving sidelink control information (SCI) and may also be configured in the UE (e.g., UE 235 or 236) by a higher layer signaling.

The PSDCH may be used for a discovery procedure. For example, a discovery signal may be transmitted over the PSDCH. The PSBCH may be used for transmitting and receiving broadcast information (e.g., system information). Also, a demodulation reference signal (DM-RS), a synchronization signal, or the like may be used in the sidelink communications between the UEs 235 and 236. The synchronization signal may include a primary sidelink synchronization signal (PSSS) and a secondary sidelink synchronization signal (SSSS).

Meanwhile, a sidelink transmission mode (TM) may be classified into sidelink TMs 1 to 4 as shown below in Table 2.

TABLE 2

| Sidelink TM | Description |
|---|---|
| 1 | Transmission using resources scheduled by base station |
| 2 | UE autonomous transmission without scheduling of base station |

TABLE 2-continued

| Sidelink TM | Description |
| --- | --- |
| 3 | Transmission using resources scheduled by base station in V2X communications |
| 4 | UE autonomous transmission without scheduling of base station in V2X communications |

When the sidelink TM 3 or 4 is supported, each of the UEs 235 and 236 may perform sidelink communications using a resource pool configured by the base station 210. The resource pool may be configured for each of the sidelink control information and the sidelink data.

The resource pool for the sidelink control information may be configured based on an RRC signaling procedure (e.g., a dedicated RRC signaling procedure, a broadcast RRC signaling procedure). The resource pool used for reception of the sidelink control information may be configured by a broadcast RRC signaling procedure. When the sidelink TM 3 is supported, the resource pool used for transmission of the sidelink control information may be configured by a dedicated RRC signaling procedure. In this case, the sidelink control information may be transmitted through resources scheduled by the base station 210 within the resource pool configured by the dedicated RRC signaling procedure. When the sidelink TM 4 is supported, the resource pool used for transmission of the sidelink control information may be configured by a dedicated RRC signaling procedure or a broadcast RRC signaling procedure. In this case, the sidelink control information may be transmitted through resources selected autonomously by the UE (e.g., UE 235 or 236) within the resource pool configured by the dedicated RRC signaling procedure or the broadcast RRC signaling procedure.

When the sidelink TM 3 is supported, the resource pool for transmitting and receiving sidelink data may not be configured. In this case, the sidelink data may be transmitted and received through resources scheduled by the base station 210. When the sidelink TM 4 is supported, the resource pool for transmitting and receiving sidelink data may be configured by a dedicated RRC signaling procedure or a broadcast RRC signaling procedure. In this case, the sidelink data may be transmitted and received through resources selected autonomously by the UE (e.g., UE 235 or 236) within the resource pool configured by the dedicated RRC signaling procedure or the broadcast RRC signaling procedure.

Hereinafter, methods for retransmission of sidelink data will be described. Even when a method (e.g., transmission or reception of a signal) to be performed at a first communication node among communication nodes is described, a corresponding second communication node may perform a method (e.g., reception or transmission of the signal) corresponding to the method performed at the first communication node. That is, when an operation of a UE #1 (e.g., vehicle #1) is described, a UE #2 (e.g., vehicle #2) corresponding thereto may perform an operation corresponding to the operation of the UE #1. Conversely, when an operation of the UE #2 is described, the corresponding UE #1 may perform an operation corresponding to the operation of the UE #2. In exemplary embodiments described below, an operation of a vehicle may be an operation of a communication node located in the vehicle.

In exemplary embodiments, signaling may be one or a combination of two or more of higher layer signaling, MAC signaling, and physical (PHY) signaling. A message used for the higher layer signaling may be referred to as a 'higher layer message' or a 'higher layer signaling message'. A message used for the MAC signaling may be referred to as a 'MAC message' or a 'MAC signaling message'. A message used for the PHY signaling may be referred to as a 'PHY message' or a 'PHY signaling message'. The higher layer signaling may refer to an operation of transmitting and receiving system information (e.g., master information block (MIB), system information block (SIB)) and/or an RRC message. The MAC signaling may refer to an operation of transmitting and receiving a MAC control element (CE). The PHY signaling may refer to an operation of transmitting and receiving control information (e.g., downlink control information (DCI), uplink control information (UCI), SCI).

A sidelink signal may be a synchronization signal and a reference signal used for sidelink communication. For example, the synchronization signal may be a synchronization signal/physical broadcast channel (SS/PBCH) block, sidelink synchronization signal (SLSS), primary sidelink synchronization signal (PSSS), secondary sidelink synchronization signal (SSSS), or the like. The reference signal may be a channel state information-reference signal (CSI-RS), DM-RS, phase tracking-reference signal (PT-RS), cell specific reference signal (CRS), sounding reference signal (SRS), discovery reference signal (DRS), or the like.

A sidelink channel may be a PSSCH, PSCCH, PSDCH, PSBCH, physical sidelink feedback channel (PSFCH), or the like. In addition, a sidelink channel may refer to a sidelink channel including a sidelink signal mapped to specific resources in the corresponding sidelink channel. The sidelink communication may support a broadcast service, a multicast service, a groupcast service, and a unicast service.

The sidelink communication may be performed based on a single SCI scheme or a multi SCI scheme. When the single SCI scheme is used, data transmission (e.g., sidelink data transmission, sidelink-shared channel (SL-SCH) transmission) may be performed based on a single SCI (e.g., $1^{st}$-stage SCI). When the multi SCI scheme is used, data transmission may be performed using two SCIs (e.g., $1^{st}$-stage SCI and 2nd-stage SCI). The SCI may be transmitted through a PSCCH and/or a PSSCH. When the single SCI scheme is used, the SCI (e.g., $1^{st}$-stage SCI) may be transmitted through a PSCCH. When the multi SCI scheme is used, the $1^{st}$-stage SCI may be transmitted through a PSCCH, and the $2^{nd}$-stage SCI may be transmitted through a PSCCH or a PSSCH. The $1^{st}$-stage SCI may be referred to as a 'first stage SCI', and the $2^{nd}$-stage SCI may be referred to as a 'second stage SCI'.

The $1^{st}$-stage SCI may include one or more information elements among priority information, frequency resource assignment information, time resource assignment information, resource reservation period information, DMRS pattern information, second stage SCI format information, beta offset indicator, number of DMRS ports, and modulation and coding scheme (MCS) information. The second stage SCI may include one or more information elements among a HARQ process identifier (ID), redundancy version (RV), source ID, destination ID, CSI request information, zone ID, and communication range requirement.

Meanwhile, for sidelink communication, a HARQ feedback operation may be supported, and a sidelink retransmission operation may be performed according to a HARQ feedback. The HARQ feedback operation for sidelink communication (hereinafter, referred to as a 'SL HARQ feedback operation') may be performed based on two schemes. In the first scheme for the SL HARQ feedback operation, all terminals participating in sidelink communication (e.g., groupcast-based sidelink communication) may share a PSFCH resource, and may transmit only NACKs using the shared PSFCH resource. The first scheme for the SL HARQ feedback operation may be a NACK-only feedback scheme.

In the second scheme for the SL HARQ feedback operation, a PSFCH resource may be independently allocated to each of the terminals, and each terminal may transmit an ACK or a NACK using the allocated PSFCH resource. The second scheme for the SL HARQ feedback operation may be an ACK/NACK feedback scheme. Alternatively, the SL HARQ feedback operation may be performed based on a combination of the two schemes described above or another scheme. A PSFCH format may be a sequence-based format.

The V2X communication (e.g., V2X communication using sidelink) may support unicast transmission, groupcast transmission, multicast transmission, and/or broadcast transmission. In a broadcast communication scenario, a retransmission procedure may be efficiently performed based on a blind retransmission scheme. When a retransmission procedure is performed based on the blind retransmission scheme in a unicast communication scenario or a groupcast communication scenario, data may not be transmitted and received reliably. Therefore, in the unicast communication scenario or the groupcast communication scenario, methods for efficiently operating a retransmission scheme based on a HARQ response (e.g., ACK or NACK) (hereinafter referred to as a 'HARQ retransmission scheme') and/or a blind retransmission scheme are required.

When the blind retransmission scheme is supported, the retransmission procedure may be performed a preconfigured number of times without feedback of a HARQ response. When the HARQ retransmission scheme is supported, the retransmission procedure may be performed when a NACK for data is received. In addition, a retransmission scheme combining the blind retransmission scheme and the HARQ retransmission scheme may be supported.

Figure 7A:
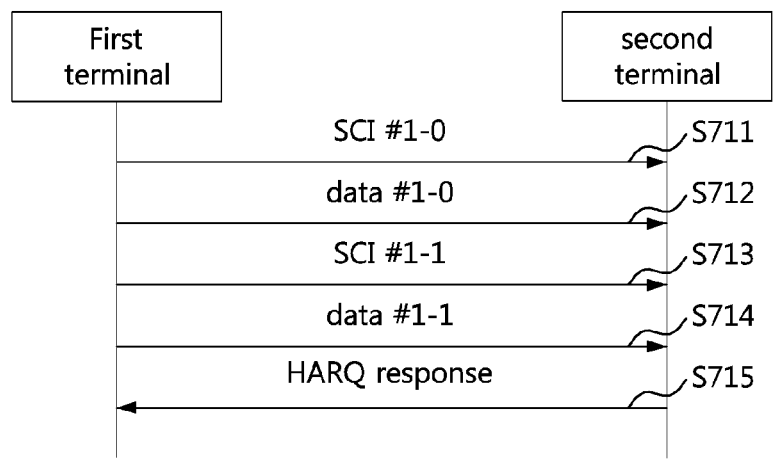
FIG. 7A is a sequence chart illustrating a first exemplary embodiment of a blind retransmission scheme in a communication system.
Figure 7B:
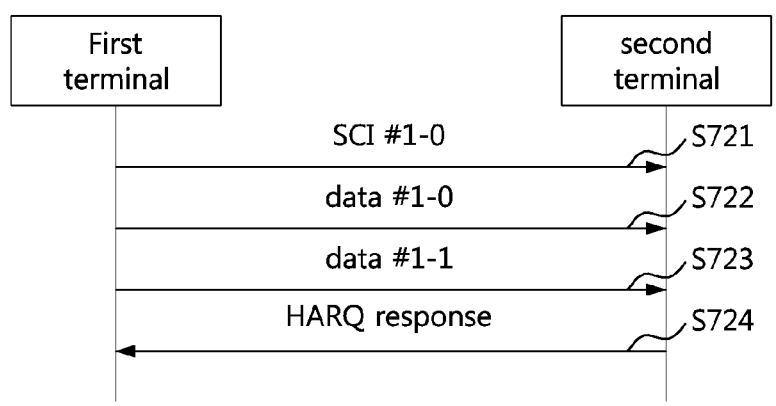
FIG. 7B is a sequence chart illustrating a second exemplary embodiment of a blind retransmission scheme in a communication system.

FIG. 7A is a sequence chart illustrating a first exemplary embodiment of a blind retransmission scheme in a communication system, and FIG. 7B is a sequence chart illustrating a second exemplary embodiment of a blind retransmission scheme in a communication system.

As shown in FIG. 7A, the communication system may include a first terminal and a second terminal. The first terminal and the second terminal may perform sidelink communication. In addition, the first terminal and the second terminal may support the V2X communication shown in FIG. 1. The first terminal may be a transmitting terminal transmitting sidelink data, and the second terminal may be a receiving terminal receiving the sidelink data. The first terminal may be the UE #5 235 shown in FIG. 2, and the second terminal may be the UE #6 236 shown in FIG. 2. The first terminal and the second terminal may be configured identically or similarly to the communication node 300 shown in FIG. 3. The first terminal and the second terminal may support the protocol stacks shown in FIGS. 4 to 6.

When the same data (e.g., the same transport block (TB)) is transmitted twice, a HARQ response (e.g., HARQ feedback) for the data may be transmitted. Here, the total number of retransmissions of the data may be 2, and the total number of retransmissions may include initial transmission of the data. The total number of retransmissions may be preconfigured. For example, the base station may configure the total number of retransmissions, and may transmit an RRC message (e.g., higher layer message) and/or MAC message including an information element indicating the total number of retransmissions. Alternatively, the total number of retransmissions may be configured by the first terminal (e.g., transmitting terminal), and the first terminal may transmit a MAC message and/or a PHY message including an information element indicating the total number of retransmissions. The total number of retransmissions may be configured through agreement between the first terminal and the second terminal. SCI #1-0 may be SCI for scheduling initial transmission, and SCI #1-1 may be SCI for retransmission. Data #1-0 may be initial transmission data, and data #1-1 may be retransmission data.

In the exemplary embodiment shown in FIG. 7A, SCI scheduling transmission of each data may be transmitted. When the same data is transmitted twice, two SCIs may be transmitted. For example, the first terminal may generate the SCI #1-0 including information element(s) for transmission/reception of the data #1-0. The SCI #1-0 may include frequency resource allocation information, time resource allocation information, MCS information, redundancy version (RV), retransmission-related information, and the like. The MCS information may include an MCS index and/or an MCS table indicator (e.g., additional MCS table indicator). The SCI #1-0 may be a $1^{st}$-stage SCI or a $2^{nd}$-stage SCI. Alternatively, the SCI #1-0 may mean SCI including a $1^{st}$-stage SCI and a $2^{nd}$-stage SCI. The first terminal may transmit the SCI #1-0 to the second terminal (S711). The SCI #1-0 may be transmitted on a PSCCH and/or PSSCH.

The second terminal may receive the SCI #1-0 from the first terminal, and may identify the information element(s) included in the SCI #1-0. The first terminal may transmit the data #1-0 to the second terminal based on the information element(s) included in the SCI #1-0 (S712). The Data #1-0 may be transmitted on a PSSCH. The Data #1-0 may be transmitted using a unicast scheme, groupcast scheme, multicast scheme, or broadcast scheme. The second terminal may receive the data #1-0 from the first terminal based on the information element(s) included in the SCI #1-0. When the total number of retransmissions is 2 and the data #1-0 is first data (e.g., initial transmission data) in the (re)transmission procedure, the second terminal may not transmit a HARQ response for the data #1-0 to the first terminal. That is, when the total number of retransmissions is greater than the number of data received in the (re)transmission procedure, the second terminal may not transmit a HARQ response to the first terminal.

Meanwhile, the SCI #1-1 including information element(s) for transmission/reception of the data #1-1 may be generated. The SCI #1-1 may include frequency resource allocation information, time resource allocation information, MCS information, RV, retransmission-related information, and the like. The data #1-1 may be the same data as the data #1-0. An RV of the data #1-1 may be different from an RV of the data #1-0. The SCI #1-1 may be a $1^{st}$-stage SCI or a $2^{nd}$-stage SCI. Alternatively, the SCI #1-1 may mean SCI including a $1^{st}$-stage SCI and a $2^{nd}$-stage SCI. The first terminal may transmit the SCI #1-1 to the second terminal (S713). The SCI #1-1 may be transmitted on a PSCCH and/or PSSCH.

The second terminal may receive the SCI #1-1 from the first terminal, and may identify the information element(s) included in the SCI #1-1. The first terminal may transmit the data #1-1 to the second terminal based on the information element(s) included in the SCI #1-1 (S714). The data #1-1 may be transmitted on a PSSCH. The data #1-1 may be transmitted using a unicast scheme, groupcast scheme, multicast scheme, or broadcast scheme. The second terminal may receive the data #1-1 from the first terminal based on the information element(s) included in the SCI #1-1. When the total number of retransmissions is 2 and the data #1-1 is second data in the (re)transmission procedure, the second terminal may transmit a HARQ response to the first terminal (S715). That is, when the total number of retransmissions is equal to the number of data received in the retransmission procedure, the second terminal may transmit a HARQ response to the first terminal.

The HARQ response may be transmitted on a PSFCH. In the step S715, a HARQ response #1-0 for the data #1-0 and a HARQ response #1-1 for the data #1-1 may be transmitted. A sequence composed of the HARQ response #1-0 and the HARQ response #1-1 may be generated, and the sequence may be transmitted in the step S715. Alternatively, one HARQ response (e.g., a single HARQ response) for the data #1-0 and the data #1-1 may be transmitted in the step S715. The HARQ response may be transmitted based on an ACK/NACK scheme or a NACK-only scheme. When the ACK/NACK scheme is used, if data is successfully decoded, an ACK for the corresponding data may be transmitted, and if decoding of the data fails, a NACK for the corresponding data may be transmitted. When the NACK-only scheme is used, if data is successfully decoded, a HARQ response (e.g., ACK) for the data may not be transmitted, and if decoding of the data fails, a NACK for the data may be transmitted. The first terminal may receive the HARQ response from the second terminal, and may identify a reception state of each of the data #1-0 and the data #1-1 based on the HARQ response.

In the exemplary embodiment shown in FIG. 7B, one SCI scheduling all transmissions of data (e.g., initial transmission data and retransmission data) may be transmitted in the (re)transmission procedure. When the total number of retransmissions is 2, one SCI for transmission/reception of two data may be used. For example, the first terminal may generate the SCI #1-0 including information element(s) for transmission/reception of the data #1-0 and information element(s) for transmission/reception of the data #1-1. The SCI #1-0 may include frequency resource allocation information, time resource allocation information, MCS information, RV, retransmission-related information, and the like. The MCS information may include an MCS index and/or an MCS table indicator. In addition, the SCI #1-0 may further include an information element indicating that SCI other than the SCI #1-0 are not transmitted in the retransmission procedure. Not transmitting SCI other than the SCI #1-0 may be explicitly or implicitly indicated by the SCI #1-0. The SCI #1-0 may be a $1^{st}$-stage SCI or a $2^{nd}$-stage SCI. Alternatively, the SCI #1-0 may mean SCI including a $1^{st}$-stage SCI and a $2^{nd}$-stage SCI. The first terminal may transmit the SCI #1-0 to the second terminal (S721). The SCI #1-0 may be transmitted on a PSCCH and/or PSSCH.

The second terminal may receive the SCI #1-0 from the first terminal, and may identify the information element(s) included in the SCI #1-0. The first terminal may transmit the data #1-0 and the data #1-1 to the second terminal based on the information element(s) included in the SCI #1-0 (S722 and S723). Each of the data #1-0 and the data #1-1 may be transmitted on PSSCH(s). Each of the data #1-0 and the data #1-1 may be transmitted using a unicast scheme, groupcast scheme, multicast scheme, or broadcast scheme. The data #1-1 may be the same data as the data #1-0. An RV of the data #1-1 may be different from an RV of the data #1-0.

The second terminal may receive the data #1-0 and the data #1-1 from the first terminal based on the information element(s) included in the SCI #1-0. When the total number of retransmissions is equal to the number of data received in the (re)transmission procedure, the second terminal may transmit a HARQ response to the first terminal (S724). The HARQ response may be transmitted on a PSFCH. In the step S724, a HARQ response #1-0 for the data #1-0 and a HARQ response #1-1 for the data #1-1 may be transmitted. A sequence composed of the HARQ response #1-0 and the HARQ response #1-1 may be generated, and the sequence may be transmitted in the step S724. Alternatively, one HARQ response (e.g., a single HARQ response) for the data #1-0 and the data #1-1 may be transmitted in the step S724. The HARQ response may be transmitted based on the ACK/NACK scheme or the NACK-only scheme. The first terminal may receive the HARQ response from the second terminal, and may identify a reception state of each of the data #1-0 and the data #1-1 based on the HARQ response.

On the other hand, not only one of the exemplary embodiment shown in FIG. 7A and the exemplary embodiment shown in FIG. 7B, but also an exemplary embodiment in which the exemplary embodiment shown in FIG. 7A and the exemplary embodiment shown in FIG. 7B are combined may be used. In this case, the SCI may be transmitted if necessary in the retransmission procedure.

In the exemplary embodiment shown in FIG. 7A, each SCI (e.g., SCI #1-0 or SCI #1-1) may include an information element indicating the total number of retransmissions, an information element indicating the total number of blind retransmissions, an information element indicating the number of the remaining retransmissions, an information element indicating the number of the remaining blind retransmissions, and/or an information element indicating whether blind retransmission is performed.

The retransmission procedure may be a procedure for retransmission of the same data. For example, a retransmission procedure #1 may be a procedure for retransmission of the first data, and a retransmission procedure #2 may be a procedure for retransmission of the second data. The blind retransmission procedure may be a procedure for retransmitting data without feedback of a HARQ response.

One or more blind retransmission procedures may be performed within one retransmission procedure. For example, the retransmission procedure #1 may include blind retransmission procedures #1 and #2. In this case, the total number of retransmissions in the retransmission procedure #1 may be equal to or greater than a sum of the total number of blind retransmissions in the blind retransmission procedure #1 and the total number of blind retransmissions in the blind retransmission procedure #2. The number of the remaining retransmissions in the retransmission procedure #1 may be equal to or greater than a sum of the number of blind retransmissions remaining in the blind retransmission procedure #1 and the number of blind retransmissions remaining in the blind retransmission procedure #2.

When one retransmission procedure includes one blind retransmission procedure, the total number of retransmissions may be equal to the total number of blind retransmissions. The total number of retransmissions may refer to the maximum number of transmissions of the same data. The total number of blind retransmissions may refer to the number of data (e.g., the same data) that can be transmitted without feedback of a HARQ response. The total number of blind retransmissions may refer to the number of data from the initial transmission data to the last retransmission data (e.g., retransmission data before feedback of a HARQ response).

When the information element indicating the number of the remaining retransmissions is k and the information element indicating the number of the remaining blind retransmissions is m, (k, m) included in the SCI may be defined as shown in Table 3 below.

TABLE 3

| SCI index | SCI #1-0 | SCI #1-1 | SCI #1-2 | SCI #1-3 |
|---|---|---|---|---|
| (k, m) | (15, 3) | (14, 2) | (13, 1) | (12, 0) |

When the information element indicating the number of the remaining retransmissions is k and the information element indicating whether blind retransmission is performed is i, (k, i) included in the SCI may be defined as shown in Table 4 below.

TABLE 4

| SCI index | SCI #1-0 | SCI #1-1 | SCI #1-2 | SCI #1-3 |
|---|---|---|---|---|
| (k, i) | (15, 1) | (14, 1) | (13, 1) | (12, 0) |

The SCI defined in each of Tables 3 and 4 may be applied when SCI for transmission of each data is transmitted as in the exemplary embodiment shown in FIG. 7A. In addition, the SCI defined in each of Tables 3 and 4 may be applied also to the exemplary embodiment shown in FIG. 7B. In Tables 3 and 4, the total number of retransmissions may be 16, and the total number of blind retransmissions may be 4. The SCI #1-0 may be used for scheduling of initial transmission data. k included in the SCI #1-0 may be set to 15, which is (the total number of retransmissions (i.e., 16)—the number of transmissions (i.e., 1) of the initial transmission data scheduled by the SCI #1-0). m included in the SCI #1-0 may be set to 3, which is (the number of total blind retransmissions (i.e., 4)—the number of transmissions (i.e., 1) of the initial transmission data scheduled by the SCI #1-0). When the number of data transmissions increases, each of k and m included in the SCI may decrease by one.

In Table 4, i set to 0 may indicate that the SCI including the corresponding i schedules transmission of the last retransmission data. For example, i set to 0 may indicate that the blind retransmission procedure ends. In Table 4, i set to 1 may indicate that the blind retransmission procedure continues after transmission of retransmission data according to the SCI including i. For example, i set to 1 may indicate that retransmission data scheduled by the SCI including i is not the last retransmission data. i may be indicated explicitly and/or implicitly by information element(s) included in the SCI (e.g., resource allocation information of a PSFCH (e.g., HARQ response), resource allocation information of a PSSCH (e.g., data), and/or a new data indicator (NDI)). The resource allocation information of the PSFCH may include information indicating a transmission timing of the HARQ response.

Meanwhile, the total number of retransmissions and/or the total number of blind retransmissions may be configured by one or a combination of two or more of RRC signaling, MAC signaling, and PHY signaling. For example, the base station may configure the total number of retransmissions and/or the total number of blind retransmissions, and may transmit an information element indicating the total number of retransmissions and/or an information element indicating the total number of blind retransmissions to the terminal(s). The total number of retransmissions may be referred to as p, and the total number of blind retransmissions may be referred to as j. (p, j) may be defined as shown in Table 5 below.

TABLE 5

|  | Case #1 | Case #2 | Case #3 | Case #4 |
|---|---|---|---|---|
| (p, j) | (16, 4) | (16, 2) | (16, 1) | (4, 4) |

In Cases #1 to #3, the total number p of retransmissions may be 16, and in Case #4, the total number p of retransmissions may be 4. In Case #1, the total number j of blind retransmissions may be 4. In this case, the HARQ response may be transmitted every four data receptions (e.g., four data including the initial transmission data). In Case #2, the HARQ response may be transmitted every two data receptions. Since the total number j of blind retransmissions in Case #3 is 1, the HARQ response may be transmitted every data reception. That is, Case #3 may refer to a case where the HARQ retransmission scheme is performed. The total number j of blind retransmissions may refer to the number of blind retransmissions before feedback of a HARQ response.

In Case #4, the total number p of retransmissions may be equal to the total number j of blind retransmissions. Here, four retransmissions may be performed, and the HARQ response may not be transmitted. That is, when the total number p of retransmissions is equal to the total number j of blind retransmissions, the HARQ response for data may not be transmitted. When data is transmitted as many times as the total number p of retransmissions, retransmission of the corresponding data (e.g., the same data) may not be performed. This may mean that the blind retransmission scheme without feedback of a HARQ response is performed.

The case(s) defined in Table 5 and/or operation methods in the case(s) may be defined in various ways according to an agreement between the transmitting terminal (e.g., first terminal shown in FIGS. 7A and 7B) and the receiving terminal (e.g., second terminal shown in FIGS. 7A and 7B). For example, in Case #4, it may be configured that the transmission operation of the HARQ response is performed after four pieces of data are transmitted. The HARQ retransmission scheme and/or the blind retransmission scheme may be operated based on (p, j) defined in Table 5. A retransmission scheme in which the HARQ retransmission scheme and the blind retransmission scheme are combined may be operated. It may be configured that the retransmission scheme in which the HARQ retransmission scheme and the blind retransmission scheme are combined is used. Also, an information element indicating that the retransmission scheme in which the HARQ retransmission scheme and the blind retransmission scheme are combined is used may be transmitted.

Meanwhile, in the retransmission procedure (e.g., blind retransmission procedure), the same data having different RVs may be retransmitted. In this case, SCI for scheduling each data may include an RV of the corresponding data. For example, the RV included in SCI may be defined as shown in Table 6 below.

TABLE 6

| SCI index | SCI #1-0 | SCI #1-1 | SCI #1-2 | SCI #1-3 |
|---|---|---|---|---|
| RV | 0 | 2 | 3 | 1 |

When the total number of retransmissions or the total number of blind retransmissions is 4, each of the SCIs may include an information element indicating the RV defined in Table 6, and data having the RV indicated by the SCI may be transmitted. Retransmission may be performed based on an incremental redundancy (IR) scheme, and four RVs (e.g., RV0, RV1, RV2, and RV3) may be used. A transmission order may be 'data having RV0→data having RV2→data having RV3→data having RV1'. Each of the data having RV0 and the data having RV3 may be self-decodable.

When SCI indicates an RV, a terminal that has not received initial SCI and/or initial transmission data and/or a terminal performing a reception operation while performing the retransmission procedure may determine whether data s decodable based on the RV indicated by the SCI. When it is determined that decoding is possible based on the RV, the terminal may decode data having the corresponding RV. For example, a terminal performing a reception operation while performing the retransmission procedure may not receive the SCI #1-0, and may receive SCI(s) after the SCI #1-0 (e.g., SCI #1-1, SCI #1-2, SCI #1-3). In this case, the terminal may decode the data by performing a soft combining operation on the data having RV2 obtained based on the SCI #1-1 and the data having RV3 obtained based on the SCI #1-2.

Alternatively, the terminal may not receive the SCI #1-0 and the SCI #1-1, and may receive SCI(s) after the SCI #1-1 (e.g., SCI #1-2, SCI #1-3). In this case, the terminal may perform a decoding operation on the data having RV3 based on the SCI #1-2. When the decoding operation for the data having RV3 fails, the terminal may decode the data by performing a soft combining operation on the data having RV3 obtained based on the SCI #1-2 and the data having RV1 obtained based on the SCI #1-3.

In the exemplary embodiment shown in FIG. 7B, the SCI #1-0 (e.g., initial SCI) may include p as defined in Table 5, j as defined in Table 5, and/or RV as defined in Table 6. When the IR scheme is used, the SCI #1-0 shown in FIG. 7B may include the RV. A retransmission scheme combining the retransmission scheme shown in FIG. 7A and the retransmission scheme shown in FIG. 7B may be performed as follows.

Figure 8:
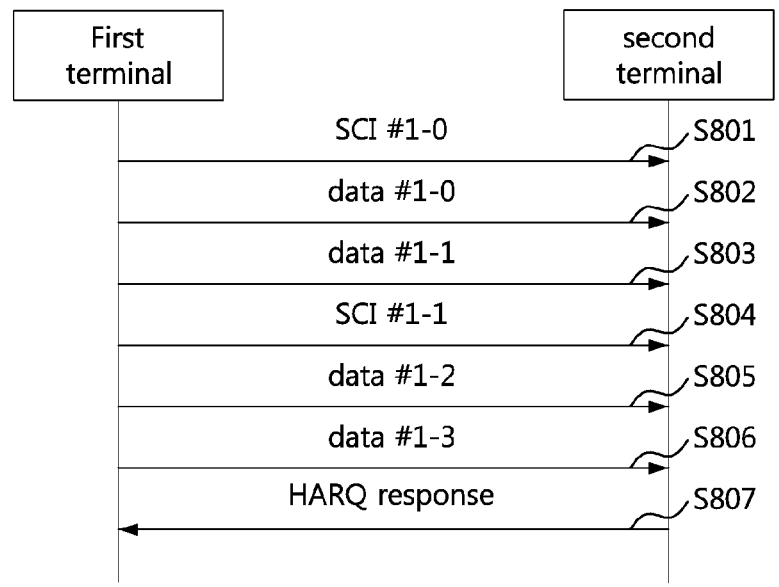
FIG. 8 is a sequence chart illustrating a third exemplary embodiment of a blind retransmission scheme in a communication system.

FIG. 8 is a sequence chart illustrating a third exemplary embodiment of a blind retransmission scheme in a communication system.

As shown in FIG. 8, the communication system may include a first terminal and a second terminal. The first terminal and the second terminal may perform sidelink communication. In addition, the first terminal and the second terminal may support the V2X communication shown in FIG. 1. The first terminal may be a transmitting terminal transmitting sidelink data, and the second terminal may be a receiving terminal receiving the sidelink data. The first terminal may be the UE #5 235 shown in FIG. 2, and the second terminal may be the UE #6 236 shown in FIG. 2. The first terminal and the second terminal may be configured identically or similarly to the communication node 300 shown in FIG. 3. The first terminal and the second terminal may support the protocol stacks shown in FIGS. 4 to 6.

Two data transmissions may be performed after SCI #1-0 (e.g., initial SCI), and two data transmissions may be performed after SCI #1-1. A HARQ response may then be transmitted. A blind retransmission procedure according to the SCI #1-0 may be a blind retransmission procedure #1, and a blind retransmission procedure according to the SCI #1-1 may be a blind retransmission procedure #2. In each of the blind retransmission procedure #1 and the blind retransmission procedure #2, the total number j of blind retransmissions may be 2. When the two blind retransmission procedures (e.g., blind retransmission procedures #1 and #2) are performed, a HARQ response may be transmitted. The total number j of blind retransmissions indicated by the SCI #1-0 may be the same as the total number j of blind retransmissions indicated by the SCI #1-1. Each of the SCI #1-0 and the SCI #1-1 may include an information element indicating the remaining number k of retransmissions and/or an information element indicating the remaining number m of blind retransmissions. In this case, (k, m) included in each of the SCI #1-0 and the SCI #1-1 may be defined as shown in Table 7 below.

TABLE 7

| SCI index | SCI #1-0 | SCI #-1 |
|---|---|---|
| (k, m) | (16, 2) | (14, 2) |

When the total number of retransmissions is 16, k included in the SCI #1-0 may be set to 16. That is, k may be a value not excluding the number of transmissions of data scheduled by the SCI #1-0. Since two data transmissions are performed by the SCI #1-0, k included in the SCI #1-1 may be set to 14. That is, k may be a value not excluding the number of transmissions of data scheduled by the SCI #1-1. When the total number of blind retransmissions is 2, m included in each of the SCI #1-0 and the SCI #1-1 may be set to 2. That is, m may be a value not excluding the number of transmissions of data scheduled by each of the SCI #1-0 and the SCI #1-1. (k, m) included in each of the SCI #1-0 and the SCI #1-1 may be set in various ways and/or set to various values. When a data transmission order according to the RVs is configured, each of the SCI #1-0 and the SCI #1-1 may include an RV for the data.

In the exemplary embodiment shown in FIG. 8, the first terminal may generate the SCI #1-0 including the above-described information element(s), and may transmit the SCI #1-0 to the second terminal (S801). The SCI #1-0 may include frequency resource allocation information, time resource allocation information, MCS information, RV, and/or retransmission-related information (e.g., k, m, i, p, and/or j). The second terminal may receive the SCI #1-0 from the first terminal, and may identify the information element(s) included in the SCI #1-0. The first terminal may transmit data #1-0 and data #1-1 to the second terminal based on the information element(s) included in the SCI #1-0 (S802 and S803). The data #1-0 and data #1-1 may be transmitted on PSSCH(s). The second terminal may receive the data #1-0 and the data #1-1 from the first terminal based on the information element(s) included in the SCI #1-0.

In addition, the first terminal may generate the SCI #1-1 including the above-described information element(s), and may transmit the SCI #1-1 to the second terminal (S804). The SCI #1-1 may include frequency resource allocation information, time resource allocation information, MCS information, RV, and/or retransmission-related information (e.g., k, m, i, p, and/or j). The second terminal may receive the SCI #1-1 from the first terminal, and may identify the information element(s) included in the SCI #1-1. The first terminal may transmit data #1-2 and data #1-3 to the second terminal based on the information element(s) included in the SCI #1-1 (S805 and S806). The data #1-2 and data #1-3 may be transmitted on PSSCH(s). The second terminal may receive the data #1-2 and data #1-3 from the first terminal based on the information element(s) included in the SCI #1-1.

Each of the data #1-0, the data #1-1, the data #1-2, and the data #1-3 may be transmitted in a unicast scheme, groupcast scheme, multicast scheme, or broadcast scheme. The data

1-0, data #1-1, data #1-2, and data #1-3 may be the same data and may have different RVs.

The second terminal may transmit HARQ responses for the received data (e.g., data #1-0, data #1-1, data #1-2, and data #1-3) to the first terminal (S807). The HARQ responses may be transmitted on a PSFCH(s). In the step S807, a HARQ response #1-0 for the data #1-0, a HARQ response #1-1 for the data #1-1, a HARQ response #1-2 for the data #1-2, and a HARQ response #1-3 for the data #1-3 may be transmitted. A sequence composed of the HARQ response #1-0, the HARQ response #1-1, the HARQ response #1-2, and the HARQ response #1-3 may be generated, and the sequence may be transmitted in the step S807. Alternatively, one HARQ response (e.g., single HARQ response) for the data #1-0, data #1-1, data #1-2, and data #1-3 may be transmitted in the step S807. The first terminal may receive the HARQ response from the second terminal, and based on the HARQ response, the first terminal may identify a reception state of each of the data #1-0, data #1-1, data #1-2, and data #1-3.

Meanwhile, in the above-described exemplary embodiments, the number of retransmissions (e.g., the number of blind retransmissions) may be a value excluding the number of transmissions of the current data or a value including the number of transmissions of the current data. In the exemplary embodiments of FIGS. 7A, 7B, and 8, the second terminal may generate combined soft bits by performing a soft combining operation, perform a decoding operation on the combined soft bits, and may determine ACK or NACK based on a result of the decoding operation.

The MCS (e.g., MCS index and/or MCS table) may be reconfigured by SCI. That is, the SCI may include reconfiguration information of the MCS (e.g., MCS index and/or MCS table). For example, the SCI may include an indicator indicating whether to change the MCS (hereinafter, referred to as a 'change indicator'). The change indicator may be included in a $1^{st}$-stage SCI and/or a $2^{nd}$-stage SCI. The change indicator may indicate whether to change the MCS index. For example, the change indicator set to a first value may indicate that the MCS index is not changed, and the change indicator set to a second value may indicate that the MCS index is changed.

Alternatively, the change indicator may indicate whether to change the MCS table. For example, the change indicator set to a first value may indicate that the existing MCS table is used, and the change indicator set to a second value may indicate that 'the existing MCS table+a new MCS table (e.g., additional MCS table)' is used or that a new MCS table is used. Here, the change indicator may be referred to as an additional MCS table indicator. The new MCS table (e.g., additional MCS table) may include MCS information related to 256 quadrature amplitude modulation (QAM) and/or MCS information related to a modulation scheme of less than 64QAM (e.g., 8QAM, 16QAM, 32QAM). The SCI may include an MCS index (e.g., changed MCS index) and/or MC S table information (e.g., changed MC S table information).

In the exemplary embodiment shown in FIG. 8, MCS change information (e.g., change indicator) may be included in the SCI #1-1. In this case, the data #1-2 and the data #1-3 may be transmitted using the MCS (e.g., MCS index and/or MCS table) indicated by the SCI #1-1. The second terminal may perform a soft combining operation and/or a decoding operation based on the MCS change information (e.g., change indicator) included in the SCI #1-1.

When a new terminal is added to a group (e.g., groupcast group) in the groupcast communication scenario and/or when a channel quality of a new terminal added to a group is poor, an MCS (e.g., MCS index and/or MCS table) may be changed (e.g., reconfigured) for the new terminal. A communication method based on SCI including the MCS change information (e.g., change indicator) may be performed as follows.

Figure 9:
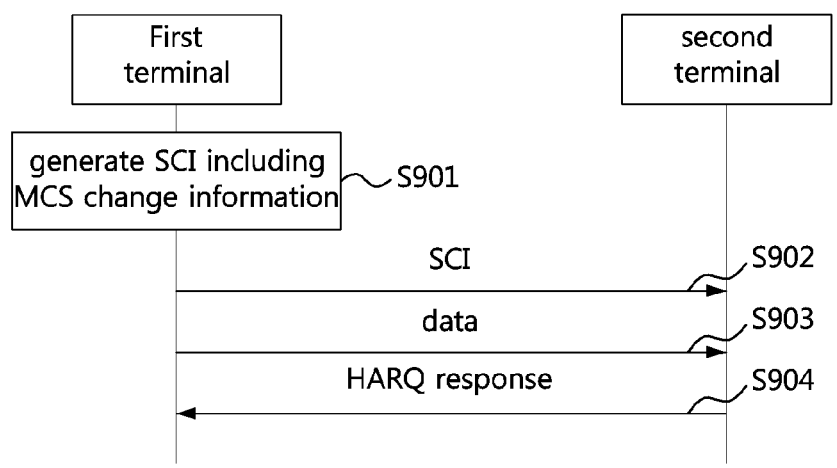
FIG. 9 is a sequence chart illustrating a first exemplary embodiment of a communication method based on SCI including MCS change information in a communication system.

FIG. 9 is a sequence chart illustrating a first exemplary embodiment of a communication method based on SCI including MCS change information in a communication system.

As shown in FIG. 9, the communication system may include a first terminal and a second terminal. The first terminal and the second terminal may perform sidelink communication. In addition, the first terminal and the second terminal may support the V2X communication shown in FIG. 1. The first terminal may be a transmitting terminal transmitting sidelink data, and the second terminal may be a receiving terminal receiving the sidelink data. The first terminal may be the UE #5 235 shown in FIG. 2, and the second terminal may be the UE #6 236 shown in FIG. 2. The first terminal and the second terminal may be configured identically or similarly to the communication node 300 shown in FIG. 3. The first terminal and the second terminal may support the protocol stacks shown in FIGS. 4 to 6.

When it is necessary to change an MCS (e.g., MCS index and/or MCS table), the first terminal may generate SCI including MCS change information (S901). The MCS change information may indicate whether a changed MCS index is used. Alternatively, the MCS change information may indicate whether a changed MCS table is used. For example, the MCS change information set to a first value may indicate that the existing MCS table is used, and the MCS change information set to a second value may indicate that 'the existing MCS table+a new MCS table (e.g., additional MCS table)' is used or that a new MCS table is used. The new MCS table may be configured by higher layer signaling.

The SCI may further include frequency resource allocation information, time resource allocation information, MCS index, and the like. The MCS index may indicate one MCS in the MCS table indicated by the MCS change information. The SCI generated in the step S901 may be a $1^{st}$-stage SCI, a $2^{nd}$-stage SCI, or SCI including a $1^{st}$-stage SCI and a $2^{nd}$-stage SCI.

The first terminal may transmit the SCI to the second terminal (S902). The SCI may be transmitted on a PSCCH and/or PSSCH. The second terminal may receive the SCI from the first terminal and may identify the information element(s) included in the SCI. The first terminal may transmit data to the second terminal based on the information element(s) included in the SCI (S903). For example, the first terminal may perform a coding operation and/or a modulation operation on the data by using the MCS corresponding to the MCS index within the MCS table indicated by the MCS change information. The data may be transmitted on a PSSCH.

The second terminal may receive the data from the first terminal based on the information element(s) included in the SCI. For example, the second terminal may perform a demodulation operation and/or a decoding operation on the data by using the MCS corresponding to the MCS index within the MCS table indicated by the MCS change information. In addition, the second terminal may transmit a HARQ response to the data to the first terminal (S904). The HARQ response may be transmitted on a PSFCH. The first terminal may receive the HARQ response for the data from the second terminal, and may identify a reception state of the data based on the HARQ response.

The exemplary embodiments of the present disclosure may be implemented as program instructions executable by a variety of computers and recorded on a computer readable medium. The computer readable medium may include a program instruction, a data file, a data structure, or a combination thereof. The program instructions recorded on the computer readable medium may be designed and configured specifically for the present disclosure or can be publicly known and available to those who are skilled in the field of computer software.

Examples of the computer readable medium may include a hardware device such as ROM, RAM, and flash memory, which are specifically configured to store and execute the program instructions. Examples of the program instructions include machine codes made by, for example, a compiler, as well as high-level language codes executable by a computer, using an interpreter. The above exemplary hardware device can be configured to operate as at least one software module in order to perform the embodiments of the present disclosure, and vice versa.

While the embodiments of the present disclosure and their advantages have been described in detail, it should be understood that various changes, substitutions and alterations may be made herein without departing from the scope of the present disclosure.

What is claimed is:

1. An operation method of a first terminal in a communication system, the operation method comprising:
   receiving a high layer signal configuring an additional modulation and coding scheme (MCS) table;
   generating first sidelink control information (SCI) including an additional MCS table indicator indicating one of the additional MCS table or an existing MCS table, and an MCS index indicating one MCS in an MCS table indicated by the additional MCS table indicator;
   transmitting, to a second terminal, the first SCI on a physical sidelink control channel (PSCCH);
   performing a coding operation and a modulation operation on first data based on the additional MCS table indicator and the MCS index; and
   transmitting, to the second terminal, the first data on a physical sidelink shared channel (PSSCH),
   wherein the first SCI further includes an information element indicating a total number transmissions of same data without reception of a hybrid automatic repeat request (HARQ) response.

2. The operation method according to claim 1, further comprising:
   transmitting one or more data to the second terminal without receiving a HARQ response for the first data,
   wherein the transmissions of the one or more data are scheduled by the first SCI, and the first data and the one or more data are same data.

3. The operation method according to claim 1, further comprising:
   transmitting second SCI for scheduling transmission of second data to the second terminal;
   transmitting the second data to the second terminal based on the second SCI; and
   receiving a HARQ response for the first data and a HARQ response for the second data from the second terminal.

4. The operation method according to claim 1, wherein the first SCI further includes an information element indicating a remaining number of retransmissions of same data and an information element indicating a remaining number of blind retransmissions of the same data, and the remaining number of blind retransmissions indicates a remaining number of transmissions of the same data without reception of a HARQ response.

5. The operation method according to claim 1, wherein the first SCI further includes an information element indicating a remaining number of retransmissions of same data and an information element indicating whether blind retransmission is performed.

6. An operation method of a second terminal in a communication system, the operation method comprising:
   receiving a high layer signal configuring an additional modulation and coding scheme (MCS) table;
   receiving, from a first terminal, first sidelink control information (SCI) on a physical sidelink control channel (PSCCH), the first SCI including resource allocation information of first data, an additional MCS table indicator indicating one of the additional MCS table or an existing MCS table, and an MCS index indicating one MCS in an MCS table indicated by the additional MCS table indicator;
   performing a monitoring operation on a physical sidelink shared channel (PSSCH) indicated by the resource allocation information; and
   performing a decoding operation on the first data obtained by the monitoring operation,
   wherein the decoding operation is performed based on the additional MCS table indicator and the MCS index, and
   wherein the first SCI further includes an information element indicating a total number of transmissions of same data without reception of a hybrid automatic repeat request (HARQ) response.

7. The operation method according to claim 6, further comprising:
   receiving one or more data from the first terminal without transmitting a HARQ response for the first data,
   wherein the transmissions of the one or more data are scheduled by the first SCI, and the first data and the one or more data are same data.

8. The operation method according to claim 6, further comprising:
   receiving second SCI for scheduling transmission of second data from the first terminal;
   receiving the second data from the first terminal based on the second SCI; and
   transmitting a HARQ response for the first data and a HARQ response for the second data to the first terminal.

9. The operation method according to claim 6, wherein the first SCI further includes an information element indicating a remaining number of retransmissions of same data and an information element indicating a remaining number of blind retransmissions of the same data, and the remaining number of blind retransmissions indicates a remaining number of transmissions of the same data without reception of a HARQ response.

10. The operation method according to claim 6, wherein the first SCI further includes an information element indicating a remaining number of retransmissions of same data and an information element indicating whether blind retransmission is performed.

11. A first terminal in a communication system, the first terminal comprising:
    a processor; and
    a memory storing one or more instructions executable by the processor, wherein the one or more instructions cause the first terminal to:
receive a high layer signal configuring an additional modulation and coding scheme (MCS) table;
select an MCS table from the additional MCS table configured by the high level signal and an existing MCS table;
generate first sidelink control information (SCI) including an additional MCS table indicator indicating one of the additional MCS table or an existing MCS table, and an MCS index indicating one MCS in an MCS table indicated by the additional MCS table indicator;
transmit, to a second terminal, the first SCI on a physical sidelink control channel (PSCCH);
perform a coding operation and a modulation operation on first data based on the additional MCS table indicator and the MCS index; and
transmit, to the second terminal, the first data on a physical sidelink shared channel (PSSCH),
wherein the first SCI includes an information element indicating a total number of transmissions of same data without reception of a hybrid automatic repeat request (HARQ) response.

12. The terminal according to claim 11, wherein the one or more instructions further cause the first terminal to transmit one or more data to the second terminal without receiving a HARQ response for the first data, wherein the transmissions of the one or more data are scheduled by the first SCI, and the first data and the one or more data are same data.

13. The terminal according to claim 11, wherein the one or more instructions further cause the first terminal to:
transmit second SCI for scheduling transmission of second data to the second terminal;
transmit the second data to the second terminal based on the second SCI; and
receive a HARQ response for the first data and a HARQ response for the second data from the second terminal.

14. The terminal according to claim 11, wherein the first SCI includes at least one of an information element indicating a remaining number of retransmissions of the same data, an information element indicating a remaining number of blind retransmissions of the same data, and an information element indicating whether blind retransmission is performed, and the remaining number of blind retransmissions indicates a remaining number of transmissions of the same data without reception of a HARQ response.

* * * * *